United States Patent
Horng et al.

(10) Patent No.: US 8,248,013 B2
(45) Date of Patent: Aug. 21, 2012

(54) FAN DEVICE WITH IMPROVED SPEED CONTROL MODULE AND PLURAL FAN SYSTEM CONSTRUCTED THEREBY

(75) Inventors: Alex Horng, Kaohsiung (TW);
Chun-Yuan Huang, Kaohsiung (TW);
Chung-Ken Cheng, Kaohsiung (TW);
Nguyen Nguyen, San Jose, CA (US);
Susheela Narasimhan, San Jose, CA (US)

(73) Assignee: Sunonwealth Electric Machine Industry Co, Ltd., Kaohsiung (TW)

( * ) Notice: Subject to any disclaimer, the term of this patent is extended or adjusted under 35 U.S.C. 154(b) by 610 days.

(21) Appl. No.: 12/411,877

(22) Filed: Mar. 26, 2009

(65) Prior Publication Data
US 2010/0244758 A1   Sep. 30, 2010

(51) Int. Cl.
*H02P 6/08*  (2006.01)

(52) U.S. Cl. ........ 318/461; 318/445; 318/811; 318/806; 318/807; 318/808; 318/809; 318/810; 318/49; 318/77; 318/111

(58) Field of Classification Search .................. 318/461, 318/445, 811, 806–810, 49, 77, 111
See application file for complete search history.

(56) References Cited

U.S. PATENT DOCUMENTS

| | | | |
|---|---|---|---|
| 4,988,930 A | 1/1991 | Oberheide | |
| 6,194,798 B1 * | 2/2001 | Lopatinsky | 310/63 |
| 6,278,248 B1 * | 8/2001 | Hong et al. | 318/400.3 |
| 6,650,074 B1 * | 11/2003 | Vyssotski et al. | 318/400.12 |
| 6,801,004 B2 * | 10/2004 | Frankel et al. | 318/268 |
| 7,042,188 B2 * | 5/2006 | Miura et al. | 318/400.09 |
| 7,211,977 B2 * | 5/2007 | Squibb | 318/400.08 |
| 7,294,980 B2 | 11/2007 | Ma et al. | |
| 7,500,911 B2 | 3/2009 | Johnson et al. | |
| 7,501,717 B2 | 3/2009 | Chen | |
| 7,679,230 B2 * | 3/2010 | Yamada et al. | 310/43 |
| 7,821,220 B2 * | 10/2010 | El-Ibiary | 318/600 |

* cited by examiner

*Primary Examiner* — Walter Benson
*Assistant Examiner* — David Luo
(74) *Attorney, Agent, or Firm* — Muncy, Geissler, Olds & Lowe, PLLC

(57) ABSTRACT

A fan device with improved speed control module includes a stator, a rotor, and a speed control module. The stator has a driving unit outputting currents for the stator to generate alternative magnetic fields and thus turn the rotor. The speed control module includes a control unit and a speed adjusting circuit, with the control unit generating a control command for the driving unit and further outputting a state signal for the speed adjusting circuit to control whether a PWM signal enters the control circuit or not.

17 Claims, 9 Drawing Sheets

FAN DEVICE WITH IMPROVED SPEED CONTROL MODULE AND PLURAL FAN SYSTEM CONSTRUCTED THEREBY

BACKGROUND OF THE INVENTION

1. Field of the Invention

The present invention relates to a fan device with improved speed control module and, more particularly, to a fan device for constructing a plural fan system with automatic speed adjustment.

2. Description of the Related Art

A conventional speed control module shown in FIG. 1 includes a control unit 91 and a signal output circuit 92. The control unit 91 has a signal input port 911 for a pulse width modulation signal (PWM signal) to be inputted into the control unit 91, a signal output port 912 connecting with and transmitting a state signal to the signal output circuit 92, and a command output port 913 connecting with and transmitting a command signal to a driving unit 93 of a fan controlled by the conventional speed control module. Furthermore, the signal output circuit 92 has a transistor 921 that acts as an electrical switch for the signal output circuit 92 to output a digital signal according to the state signal. Thereby, the control unit 91 receives the PWM signal through the signal input port 911 and generates the command signal corresponding to the PWM signal to operate the fan. Besides, according to a state of the fan, which is identified as a normal state or an abnormal state, the state signal transmitted to the signal output circuit 92 is at a HIGH voltage level or a LOW voltage level, and the signal output circuit 92 amplifies the amplitude of the state signal to form the digital signal for being in further use. However, while a plurality of the above-mentioned fans constructs a plural fan system, with each fan being controlled by the above-mentioned speed control module, an operation of the plural fan system with well coordination of the fans is unachievable if only a parallel connection between the fans is applied. Namely, the fans constructing the plural fan system separately work without adjustments in speed when any one of them is in an abnormal or broken state that reduces blowing efficiency of the plural fan system.

Alternatively, when a plural fan system able to automatically change speeds of normal fans thereof during a breakdown period of any fan of the plural fan system is required, a control center circuit connecting to the signal output circuits 92 of all the fans and able to respectively adjust the PWM signals entering the control units 91 is necessary. Thus, the control center circuit adjusts the PWM signals according to the digital signals formed by the signal output circuit 92, so as to change the speeds of the normal fans and maintain blowing efficiency of the plural fan system. However, the control center circuit not only increases manufacture cost of the plural fan system, but also has to be replaced with another one when a demanded number of fans constructing the plural fan system is changed.

Another conventional speed control module applied in a plural motor fan system is described in U.S. Pat. No. 4,988,930 entitled "PLURAL MOTOR FAN SYSTEM WITH IMPROVED SPEED CONTROL". The conventional speed control module is for speed control over a first DC fan and a second DC fan, with the two DC fans connecting with each other in parallel and at least one of them providing two speed levels. Besides, the conventional speed control module is a circuit with a plurality of electrical switches, and the two DC fans are fed with a DC power passing through the said circuit. Thus, by controlling each of the electrical switches open or close, the speed control module can select the speed levels of the two DC fans, so as to change the speeds of the DC fans.

Nevertheless, states of the DC fans are not automatically sent to the conventional speed control module, and thus automatic control over the electrical switches of the speed control module for speed adjustment of the DC fans corresponding to states thereof is unachievable. In other words, the conventional speed control module is unable to raise the speed of one of the DC fans immediately and automatically for maintaining blowing efficiency of the plural motor fan system during a breakdown period of the other DC fan. Moreover, the conventional speed control module still has to be replaced with another one when a demanded number of fans used in the plural motor fan system is changed. Hence, there is a need for an improvement over the conventional speed control module.

SUMMARY OF THE INVENTION

It is therefore the primary objective of this invention to provide a fan device with improved speed control module and a plural fan system constructed thereby, wherein the plural fan system is constructed only by electrically connecting plural fan devices in parallel, with speeds of the normal fan devices being able to change automatically if any one of the fans turns into an abnormal state.

The secondary objective of this invention is to provide the fan device with improved speed control module and the plural fan system constructed thereby, with the normal fan devices able to turn at a predetermined speed when any one of all the fan devices is broken or abnormal.

A fan device with improved speed control module according to one aspect of the present invention includes a stator, a rotor, and a speed control module. The stator has a magnetizing member with a plurality of coils 111, and a driving unit electrically connecting with the coils. The rotor has a shaft with an end rotatably coupling to the stator, an impeller fixed to another end of the shaft, and an annular magnet mounted to an inner periphery of the impeller and facing the magnetizing member. The speed control module has a control unit and a speed adjusting circuit. The control unit provides a signal input port connecting to a pulse width modulation signal terminal, a signal output port connecting to the speed adjusting circuit, and a command output port connecting with the driving unit; and the speed adjusting circuit connects between the signal output port and the pulse width modulation signal terminal. The pulse width modulation signal terminal is for receiving a pulse width modulation signal, and the control unit sends a command signal to the driving unit and generates a state signal for the speed adjusting circuit to determine whether the pulse width modulation signal enters the control unit or not. Accordingly, what is needed for a construction of a plural fan system is only to electrically connect a plurality of the fan devices disclosed above with each other, with speeds of the normal fan devices being able to change automatically if any one of the fans turns into an abnormal state. Therefore, the present invention can reduce manufacture cost of the plural fan system.

In an example, the speed adjusting circuit has a first port, a second port, and an electrical switch. The first port connects with the signal output port of the control unit, the second port connects with the pulse width modulation signal terminal, and the electrical switch links the first and second ports. Furthermore, the electrical switch is in an ON or OFF state to control the pulse width modulation signal to enter the control unit or not. Accordingly, because the speed adjusting circuit can be accomplished by the simple structure mentioned above, the present invention can further reduce manufacture cost of the plural fan system.

Further scope of the applicability of the present invention will become apparent from the detailed description given hereinafter. However, it should be understood that the detailed description and specific examples, while indicating preferable embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
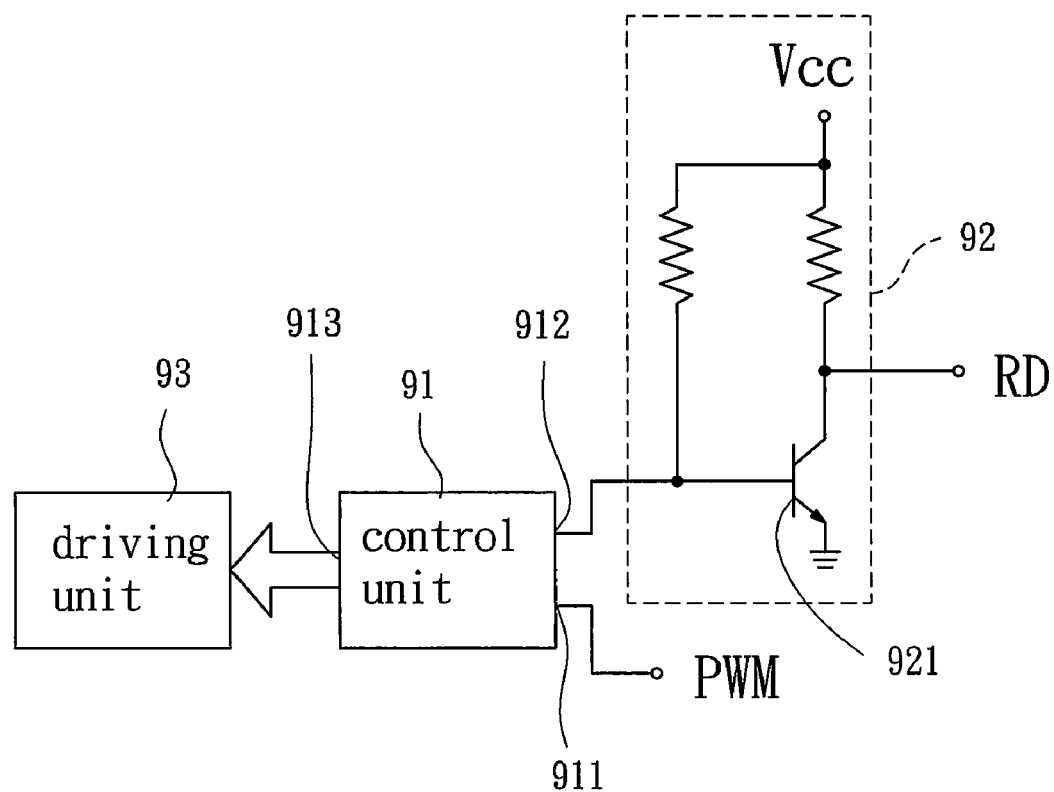
FIG. 1 is a circuit sketch of a conventional speed control module.

In the various figures of the drawings, the same numerals designate the same or similar parts. Furthermore, when the terms "first", "second", "third", "inner" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 2:
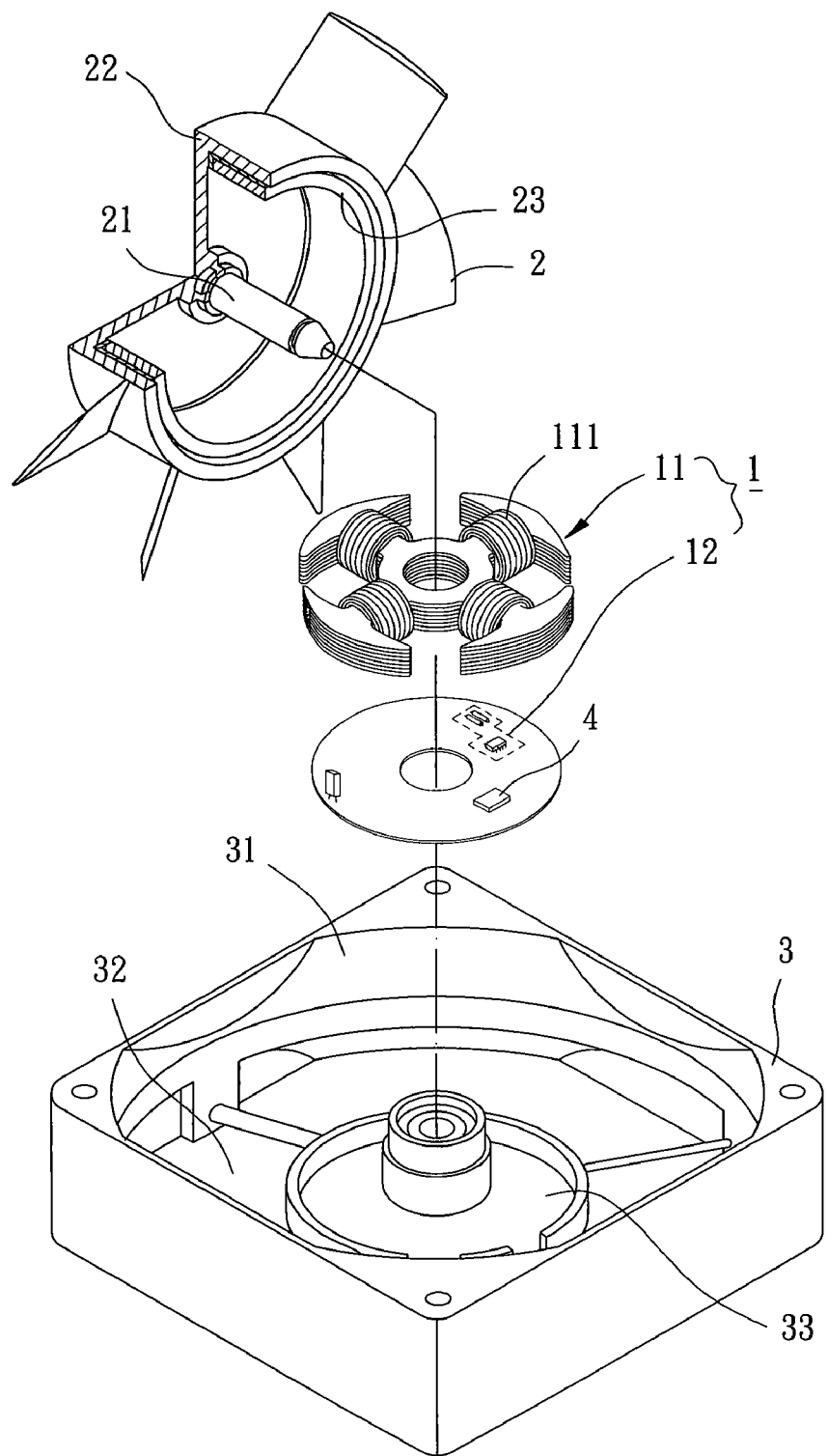
FIG. 2 is an exploded perspective view illustrating a preferable example of a fan device with improved speed control module of the present invention.

FIG. 2 illustrates a preferable example of a fan device with improved speed control module of the present invention, which includes a stator 1, a rotor 2, a housing 3, and a speed control module 4. The stator 1 has a magnetizing member 11 with a plurality of coils 111, and a driving unit 12 electrically connecting with the coils 111, so that an alternating magnetic field drives the rotor 2 to turn relative to the stator 1 when the driving unit 12 outputs currents passing through the coils 111 and then generates the alternating magnetic field. The rotor 2 has a shaft 21 with an end extending through the magnetizing member 11 and rotatably coupling to the stator 1, an impeller 22 with a center portion fixed to another end of the shaft 21, and an annular magnet 23 mounted to an inner periphery of the impeller 22 and facing the magnetizing member 11. The housing 3 has an air inlet 31 and an air outlet 32 formed on any two side walls of the housing 3 according to the type of the fan device, and further has a carrying seat 33 formed inside the housing 3 for holding the stator 1, rotor 2, and speed control module 4. The speed control module 4 also electrically connects with the driving unit 12, so as to send a command signal to the driving unit 12 after generating the command signal according to a pulse width modulation signal (PWM signal). Moreover, the speed control module 4 preferably has any one of the following described circuit structures, so that the plural fan system with automatic speed-adjustment and constructed only by parallel connection of plural fan devices is realizable.

Figure 3:
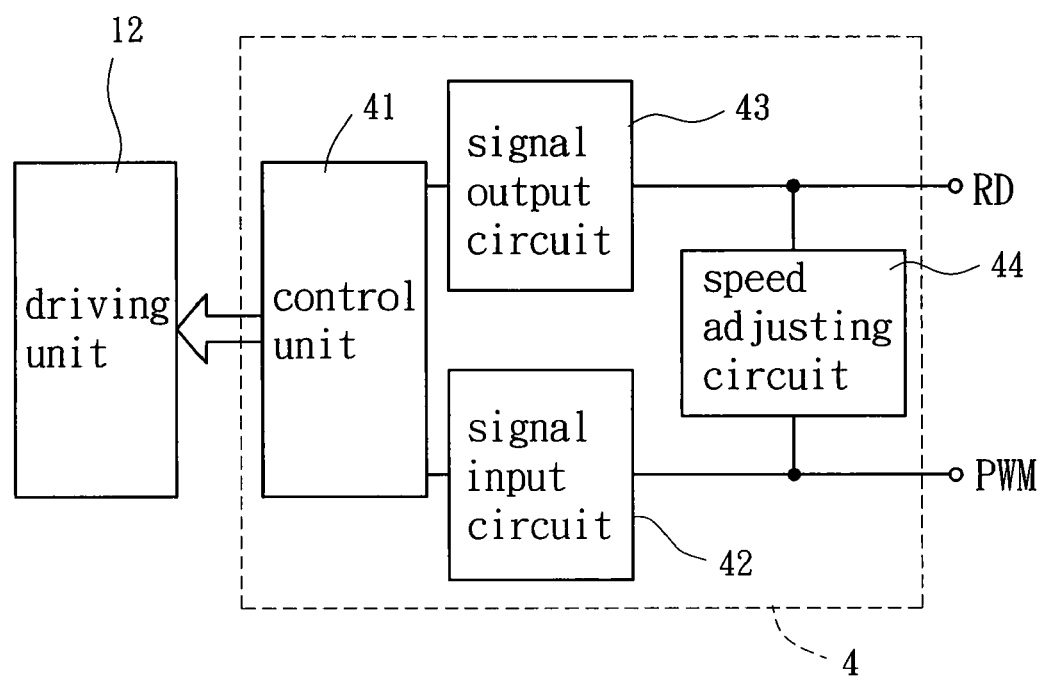
FIG. 3 is a circuit sketch of a first embodiment of a speed control module of the fan device of the present invention.

Please refer to FIG. 3 now, which shows a circuit sketch of a first embodiment of the speed control module 4, wherein the speed control module 4 includes a control unit 41, a signal input circuit 42, a signal output circuit 43, and a speed adjusting circuit 44. The control unit 41 connects between the signal input circuit 42 and the driving unit 12. The signal input circuit 42 connects with a pulse width modulation signal terminal (PWM signal terminal) "PWM" of the speed control module 4, which connects with a signal source providing the PWM signal, so as to receive the PWM signal and boost the PWM signal to obtain a PWM control signal. The signal output circuit 43 connects with and receives a state signal from the control unit 41, and further transfers the state signal into a speed adjusting command. The speed adjusting circuit 44 connects between the signal output circuit 43 and the PWM signal terminal "PWM" and determines whether the PWM signal enters the signal input circuit 42 or not based on the speed adjusting command. Thereby, when the PWM signal enters, the signal input circuit 42 obtains the PWM control signal and sends it to the control unit 41 for generating a normal command signal, which is corresponding to the PWM control signal and acts as the command signal sent to the driving unit 12. Otherwise, when the PWM signal does not successfully enter the signal input circuit 42, which means that the control unit 41 does not receive the PWM control signal, the control unit 41 accordingly generates an accelerating command signal acting as the command signal sent to the driving unit 12.

Please be noted that a voltage at a HIGH voltage level mentioned hereinafter switches a npn transistor switch on or a pnp transistor switch off when it forms a base-emitter bias of the npn transistor switch or pnp transistor switch. Besides, the voltage at the HIGH voltage level also turns a diode off when it builds a cathode-anode bias of the diode or an anode-cathode bias of the diode if the diode is of a breakdown diode. Similarly, hereinafter, a voltage at a LOW voltage level switches a npn transistor switch off or a pnp transistor switch on when it forms a base-emitter bias of the npn transistor switch or pnp transistor switch. And the voltage at the LOW voltage level also turns a diode on when it is built at a cathode of the diode with another positive voltage building at an anode of the diode. For example, a DC 12 V voltage source can provides the voltage at the HIGH voltage level, and the voltage at the LOW voltage level can be obtained through grounding.

Figure 4:
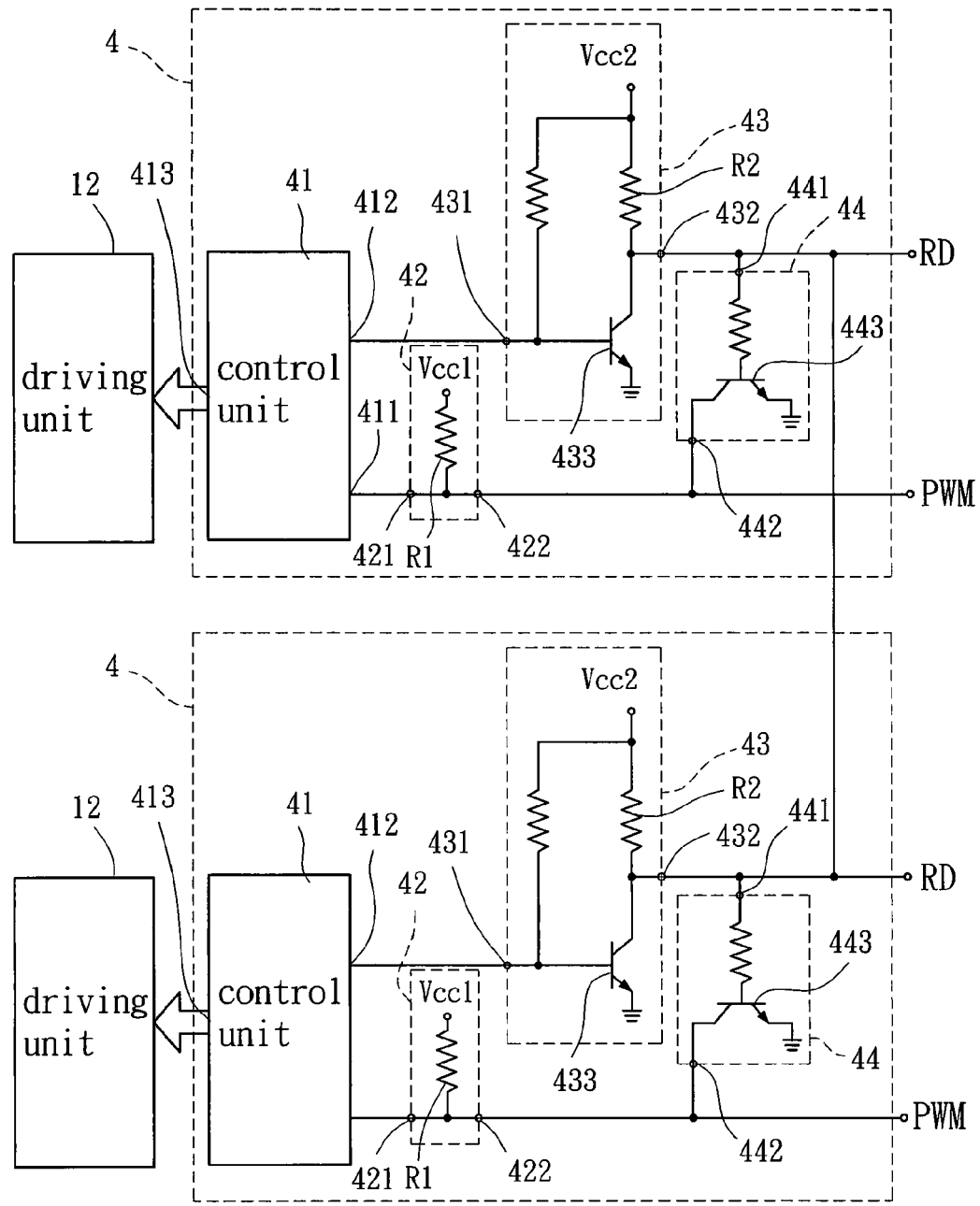
FIG. 4 is a circuitry of the first embodiment of the speed control module of the present invention.
Figure 5:
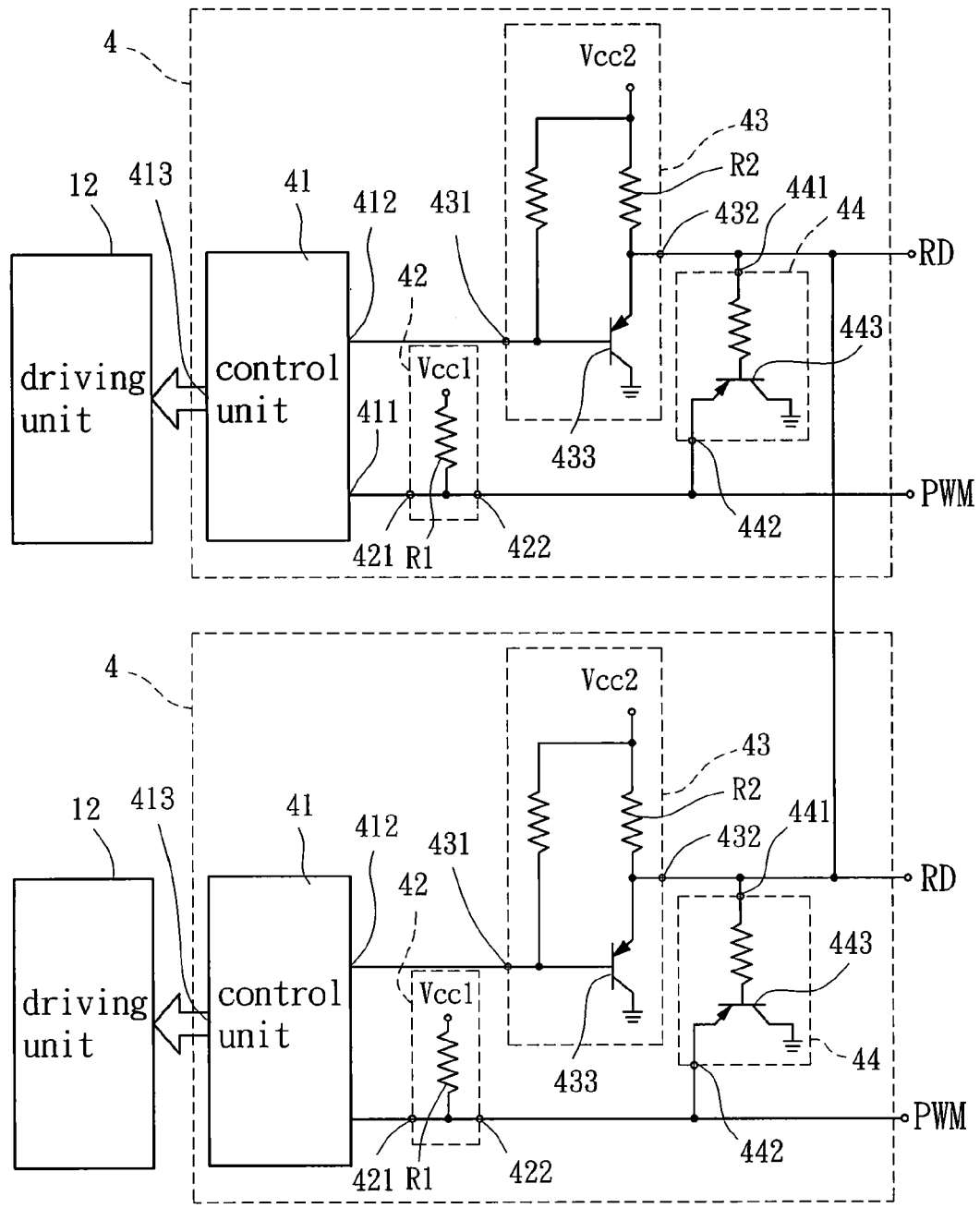
FIG. 5 is another circuitry of the first embodiment of the speed control module of the present invention.

Turning to FIG. 4, a circuitry of the first embodiment of the speed control module 4 with a connection between two speed control modules 4 of any two of fan devices constructing a plural fan system is shown. The control unit 41 has a signal input port 411, a signal output port 412, and a command output port 413 connecting with the signal input circuit 42, signal output circuit 43, and driving unit 12 respectively. In this embodiment, the control unit 41 of the speed control module 4 outputs the accelerating command signal by the command output port 413 when the signal input port 411 is at the LOW voltage level or grounds, so as to control the fan device with this speed control module 4 to turn at a predetermined speed, such as the full speed of the fan device. The signal input circuit 42 has an output port 421 and an input port 422 separately connecting with the signal input port 411 and the PWM signal terminal "PWM", and further has a resistor R1 with one end connecting with a DC voltage source Vcc1 and another end forming the two ports 421, 422. The signal output circuit 43 includes an input port 431 connecting with the signal output port 412, an output port 432 for outputting the speed adjusting command, and a transistor 433 acting as an electrical switch. Besides, while the transistor 433 is a npn transistor, a base and a collector thereof respectively form the input port 431 and output port 432, with an emitter of the transistor 433 grounding. On the other hand, if the transistor 433 is a pnp transistor as shown in FIG. 5, the base and emitter thereof respectively form the input port 431 and output port 432 while the collector of the transistor 433 grounds. Besides, the collector or emitter forming the output port 432 further connects to a DC voltage source Vcc2, which is preferably identical to the DC voltage source Vcc1. The speed adjusting circuit 44 has a first port 441 connecting with the output port 432 of the signal output circuit 43, and a second port 442 connecting with the PWM signal terminal "PWM" and the input port 422 of the signal input circuit 42. In detail, the speed adjusting circuit 44 further has a transistor 443 linking the first and second ports 441, 442 and also acting as an electrical switch. Besides, while the transistor 443 is a npn transistor, a base of the transistor 443 connects to the first port 441 through a resistor, a collector thereof forms the second port 442, and an emitter thereof grounds. Alternatively, while the transistor 443 is a pnp transistor as shown in FIG. 5, the collector grounds instead of forming the second port 442, and the emitter does not ground but forms the second port 442.

Please Refer to FIG. 4 again. The plural fan system is constructed by a plurality of the fan devices, with the output ports 432 of the speed control modules 4 of the fan devices connecting with each other. Thereby, when all the fan devices work normally and the two transistors 433, 443 are both npn transistors for each speed control module 4, each of the control units 41 of the fan devices outputs a signal at the HIGH voltage level as the state signal. Therefore, resistance between the collector and emitter of the transistor 433 is approximately zero, and thus the output port 432 is at the LOW voltage level approximating the ground. Accordingly, the transistor 443 is maintained in its cutoff region, that is, in an OFF state, because the first port 441 of the speed adjusting circuit 44 approximately grounds through the output port 432 and transistor 433. As a result, the PWM signal continuously enters and is boosted by the signal input circuit 42 via the DC voltage source Vcc1, so that the PWM control signal for the control unit 41 to generate the normal command signal corresponding to the PWM control signal is obtained. Finally, each of the fan devices turns according to the PWM control signal.

On the contrary, when any one of the fan devices constructing the plural fan system is in an abnormal state, the control unit 41 of the failed fan device outputs a signal at the LOW voltage level as the state signal. Therefore, the transistor 433 is in its cutoff region without any current flow between the collector and emitter thereof, and thus the output port 432 is at the HIGH voltage level provided by the DC voltage source Vcc2. Accordingly, the transistor 443 switches into its saturation region, that is, in an ON state, because the first port 441 of the speed adjusting circuit 44 is also at the HIGH voltage level provided by the DC voltage source Vcc2. As a result, the PWM signal terminal "PWM" and the signal input port 411 of the control unit 41 are approximately grounded through the transistor 443 for the control unit 41 to generate the accelerating command signal. Moreover, owing to the direct connection of the output ports 432 between all the fan devices, the transistor 443 of each fan device in the normal state also switches into the ON state and causes the control unit 41 thereof to generate the accelerating command signal and send it to the driving unit 12. Consequently, except for the fan device in the abnormal state, each fan device is controlled by the speed control module 4 thereof, which outputs the accelerating command signal, and thus turns at the predetermined speed. Thereby, rotation speeds of the normal fan devices are automatically adjusted to the predetermined speed when any one of the fan devices constructing the plural fan system is abnormal or so broken to work, so that a variation in blowing efficiency of the plural fan system is minimized.

Figure 6:
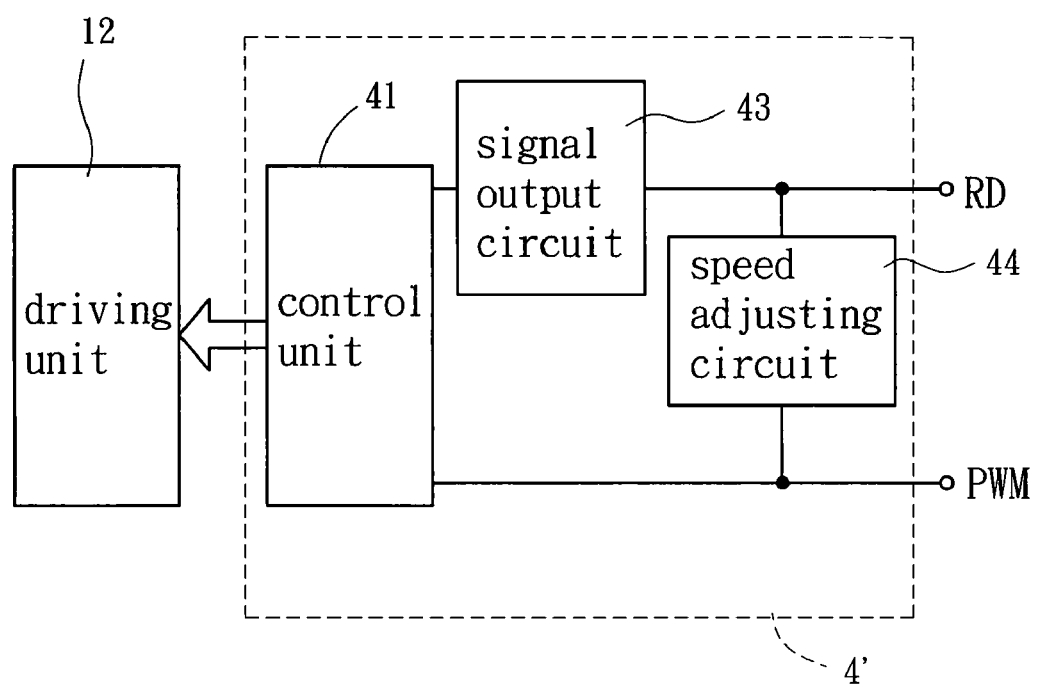
FIG. 6 is a circuit sketch of a second embodiment of the speed control module of the present invention.

Please refer to FIG. 6, which shows a circuit sketch of another speed control module 4' taken as a second embodiment. In comparison with the speed control module 4 in the previous embodiment, a signal input circuit 42 is absent in the speed control module 4' while a control unit 41, a signal output circuit 43, and a speed adjusting circuit 44' are utilized. The condition for the above-mentioned omission of the signal input circuit 42 is that a voltage level of the PWM signal is high enough to actuate the control unit 41 without a voltage boost that could be provided by the absent signal input circuit 42. Namely, the control unit 41 of the speed control module 4' directly receives the PWM signal.

Figure 7:
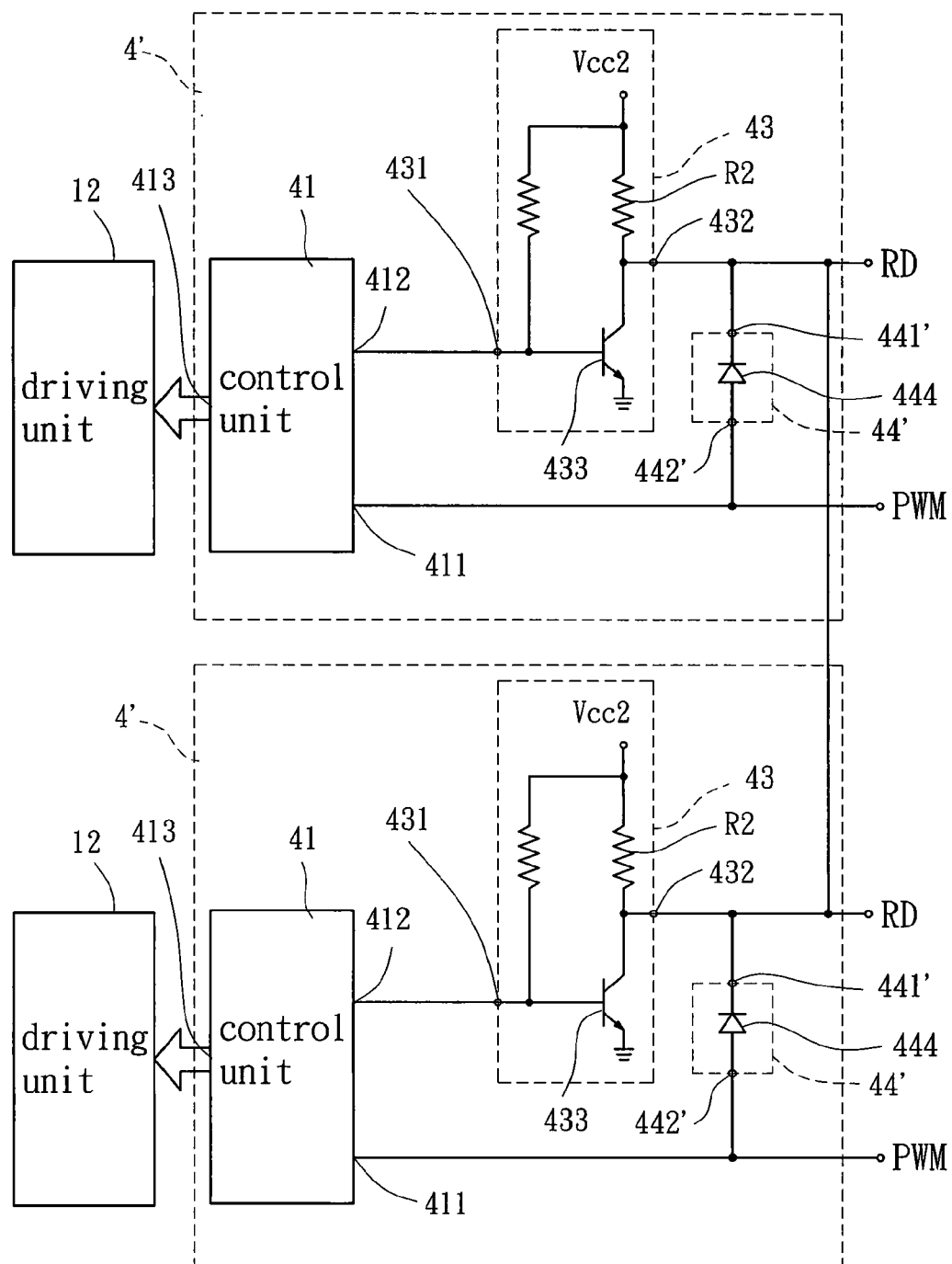
FIG. 7 is a circuitry of the second embodiment of the speed control module of the present invention.

Now referring to FIG. 7, a circuitry of the speed control module 4' with a connection between two speed control modules 4' of any two of fan devices constructing a plural fan system is shown. The structures of and relationship between the control unit 41 and signal output circuit 43 are substantially identical to those of the first embodiment, but the speed control modules 4' has a diode 444 instead of the transistor 443 used in the first embodiment. Specifically, the speed adjusting circuit 44' has a first port 441' connecting with the output port 432 of the signal output circuit 43, and a second port 442' connecting with the PWM signal terminal "PWM" and the signal input port 411 of the control unit 41, while the diode 444 links the first and second ports 441', 442' with a cathode of the diode 444 forming the first port 441' and an anode thereof forming the second port 442'. Furthermore, the output ports 432 of the speed control modules 4' of the fan devices also connect with each other when these fan devices construct the plural fan system. Thereby, when all the fan devices work normally, each of the control units 41 of the fan devices outputs a signal at the LOW voltage level as the state signal. Therefore, the transistor 433 is in its cutoff region, and thus the output port 432 is at the HIGH voltage level provided by the DC voltage source Vcc2. Accordingly, the diode 444 is turned off, that is, in the OFF state, because the first port 441' of the speed adjusting circuit 44' is also at the HIGH voltage level provided by the DC voltage source Vcc2. As a result, for each fan device, the PWM signal continuously enters the control unit 41 for the fan device to turn according to the PWM signal.

On the contrary, when any one of the fan devices constructing the plural fan system is in the abnormal state, the control unit 41 of the failed fan device outputs a signal at the HIGH voltage level as the state signal. Therefore, resistance between the collector and emitter of the transistor 433 is approximately zero, and thus the output port 432 is at the LOW voltage level approximating the ground. Accordingly, the first port 441' of the speed adjusting circuit 44' is also at the LOW voltage level approximating the ground and thus turned on. As a result, the control unit 41 generates the accelerating command signal because the PWM signal terminal "PWM" and the signal input port 411 of the control unit 41 are approximately grounded through the diode 444. Owing to the direct connection of the output ports 432 between all the fan devices, the diode 444 of each fan device in the normal state also turns on and causes the control unit 41 thereof to generate the accelerating command signal and send it to the driving unit 12. Consequently, except for the fan device in the abnormal state, each fan device is controlled by the speed control module 4' outputting the accelerating command signal and thus rotation speeds of the normal fan devices are automatically adjusted to the predetermined speed.

Please note that the speed adjusting circuits 44 used in the first embodiment can all be replaced by the speed adjusting circuits 44' having the diodes 444, and the fan devices of the second embodiment can also use the speed adjusting circuits 44 with the transistor 443.

Figure 8:
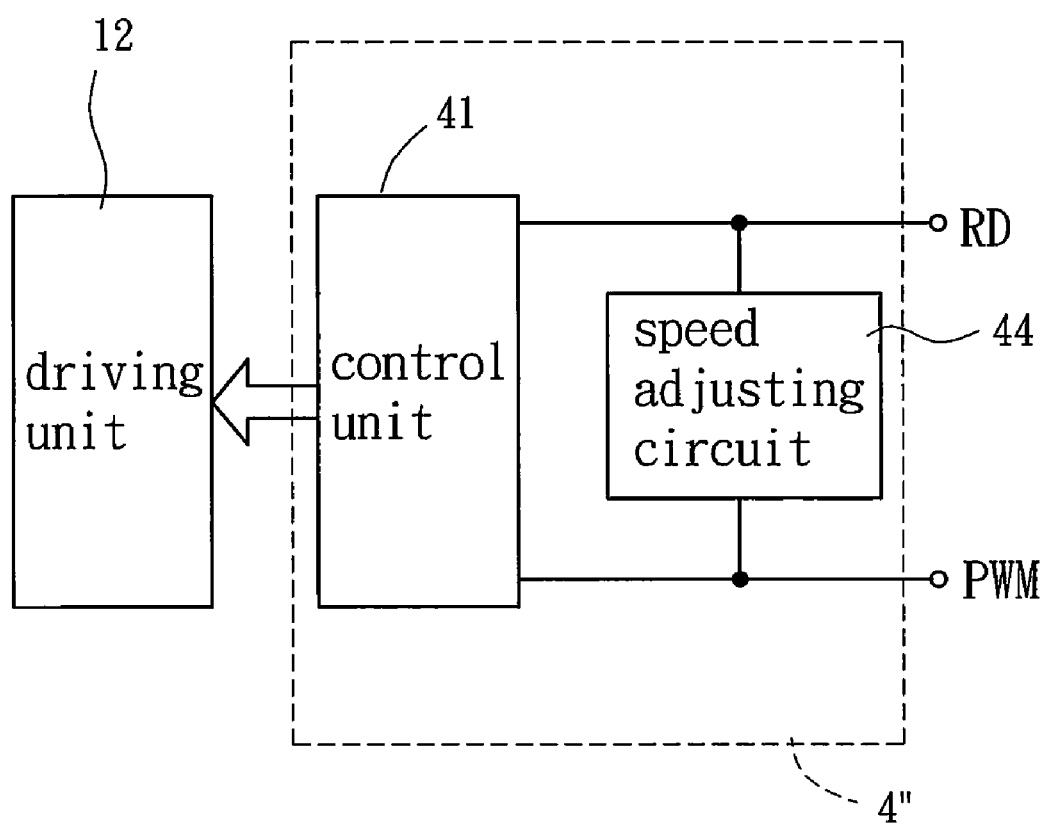
FIG. 8 is a circuit sketch of a third embodiment of the speed control module of the present invention.
Figure 9:
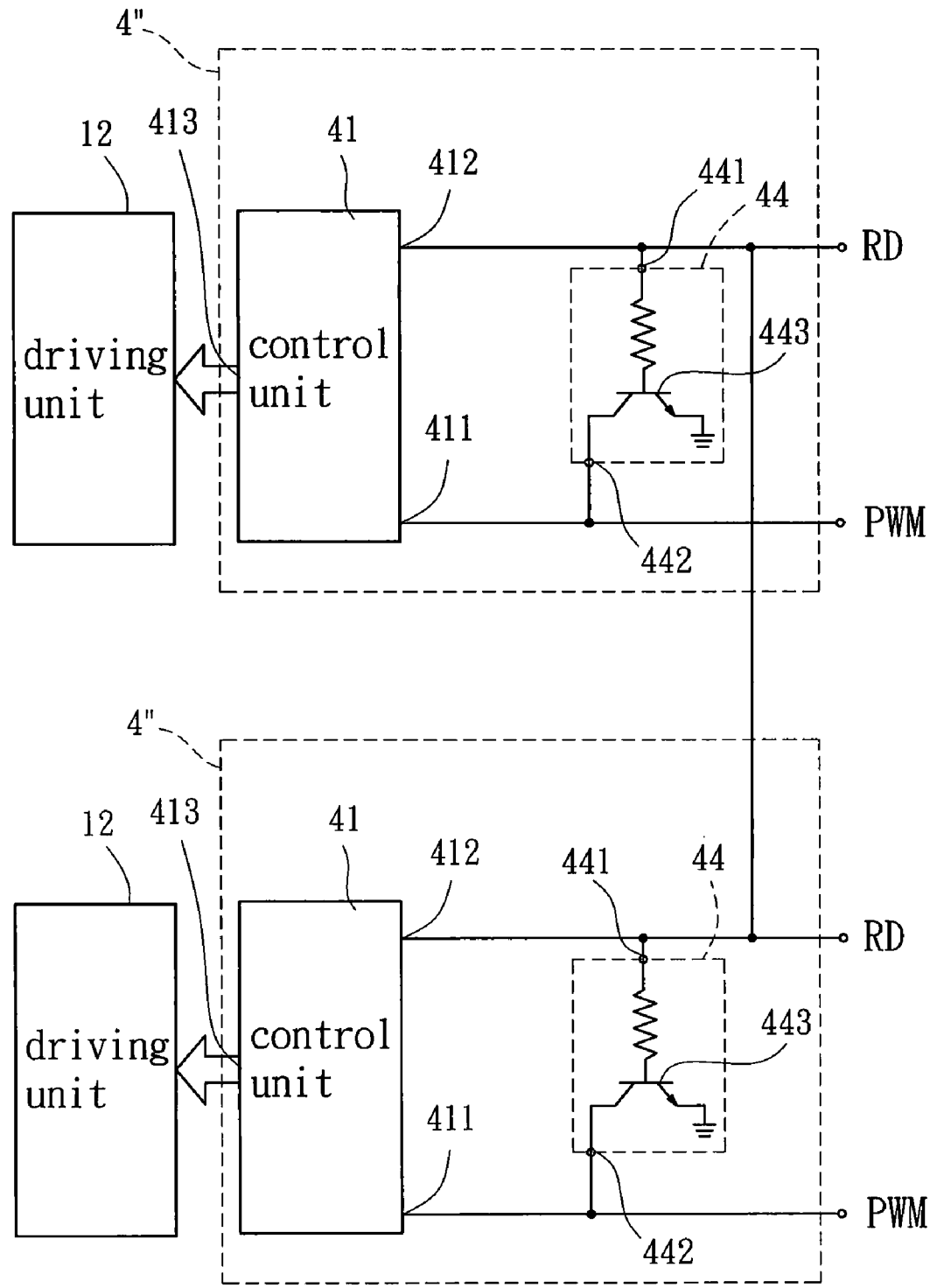
FIG. 9 is a circuitry of the third embodiment of the speed control module of the present invention.

Turning to FIG. 8 now, a circuit sketch of further another speed control module 4" regarded as a third embodiment is shown. In comparison with the previous disclosed speed control module 4', only a control unit 41 and a speed adjusting circuit 44 are still utilized, which are identical to those used in the first embodiment. Thereby, the control unit 41 of the speed control module 4" not only directly receives the PWM signal by the signal input port 411, but also directly sends the state signal to the speed adjusting circuit 44 for which to determine whether the PWM signal enters the control unit 41 or not.

Referring to FIG. 8, a circuitry of the third embodiment of the speed control module 4" with a connection between two speed control modules 4" of any two of fan devices constructing a plural fan system is shown. Specifically, the first port 441 of the speed adjusting circuit 44 connects with the signal output port 412 of the control unit 41 for the control unit 41 to directly send the state signal to the speed adjusting circuit 44. Furthermore, the signal output ports 412 of the control units 41 of the fan devices connect with each other when these fan devices construct the plural fan system. Thereby, when all the fan devices work normally, each of the control units 41 of the fan devices outputs a signal at the LOW voltage level as the state signal, and thus the transistor 443 is maintained in its cutoff region because the first port 441 receives the state signal. As a result, for each fan device, the PWM signal continuously enters the control unit 41 to generate the normal command signal corresponding to the PWM signal, and the fan device turns according to the PWM signal.

On the contrary, when any one of the fan devices constructing the plural fan system is in the abnormal state, the control unit 41 of the failed fan device outputs a signal at the HIGH voltage level as the state signal. Therefore, resistance between the collector and emitter of the transistor 443 is approximately zero, and thus the control unit 41 generates the accelerating command signal because the PWM signal terminal "PWM" and the signal input port 411 of the control unit 41 are approximately grounded through the transistor 443. Consequently, owing to the direct connection between the signal output ports 412 of the fan devices, resistance between the collector and emitter of the transistor 443 of each normal fan device is also approximately zero, and the speed control module 4" thereof also sends the accelerating command signal to the driving unit 12. Hence, the rotation speeds of all the normal fan devices are automatically adjusted to the predetermined speed.

As has been discussed above, in comparison with the plural fan system using the control center circuit besides the fans having the conventional speed control module or the plural motor fan system unable to flexibly adjust the number of fans used in the plural motor fan system, the present invention has the following outstanding characters. With a simple structure of the speed control module 4, 4', or 4" able to be realized with the control unit 41 and the speed adjusting circuit 44, or 44' only, the fan devices accomplish the plural fan system merely through a direct connection between the speed control modules 4, 4', or 4" thereof. Specifically, the plural fan system can automatically change speeds of the normal fan devices if any one of the fans turns into an abnormal state. Consequently, the fan device of the present invention can construct a plural fan system with a function low manufacturing cost and automatic speed-adjustment.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A plural fan system constructed by a plurality of fan devices, with each fan device comprising:
   a stator having a magnetizing member with a plurality of coils, and a driving unit electrically connecting with the coils;
   a rotor having a shaft with an end rotatably coupling to the stator, an impeller fixed to another end of the shaft, and an annular magnet mounted to an inner periphery of the impeller and facing the magnetizing member; and
   a speed control module having a control unit and a speed adjusting circuit, with the control unit providing a signal input port connecting to a pulse width modulation signal terminal, a signal output port connecting to the speed adjusting circuit, and a command output port connecting with the driving unit, with the speed adjusting circuit connecting between the signal output port and the pulse width modulation signal terminal,
   wherein the pulse width modulation signal terminal is for receiving a pulse width modulation signal, and the control unit sends a command signal to the driving unit and generates a state signal for the speed adjusting circuit to determine whether the pulse width modulation signal enters the control unit or not, with the signal output ports of the control units of the fan devices electrically connecting with each other,
   wherein, in which, upon entry into an abnormal state of any of the fan devices, the speed control module of each normally functioning fan device outputs an accelerating command signal to its driving unit, thereby setting the rotational speed of the remaining functional fan devices to a predetermined speed.

2. The fan device with improved speed control module as defined in claim 1, wherein the signal output port connects to the speed adjusting circuit through a signal output circuit receiving the state signal, transferring the state signal into a speed adjusting command, and sending the speed adjusting command to the speed adjusting circuit.

3. The fan device with improved speed control module as defined in claim 2, wherein the speed adjusting circuit has a first port connecting with the signal output circuit, a second port connecting with the pulse width modulation signal terminal, and an electrical switch linking the first and second ports, with the electrical switch being in an ON or OFF state to control the pulse width modulation signal to enter the control unit or not.

4. The fan device with improved speed control module as defined in claim 2, wherein the signal input port connects to the pulse width modulation signal terminal through a signal input circuit.

5. The fan device with improved speed control module as defined in claim 2, wherein the signal output circuit has an output port connecting with the speed adjusting circuit for sending the speed adjusting command to the speed adjusting circuit.

6. The fan device with improved speed control module as defined in claim 3, wherein the electrical switch is a transistor or a diode.

7. The fan device with improved speed control module as defined in claim 3, wherein the command output port of the control unit outputs an accelerating command signal as the command signal when the signal input port is grounds or at a LOW voltage level.

8. The fan device with improved speed control module as defined in claim 7, wherein the electrical switch is a npn transistor, whose base connects to the first port, collector forms the second port, and emitter grounds.

9. The fan device with improved speed control module as defined in claim 7, wherein the electrical switch is a pnp transistor, whose base connects to the first port, collector grounds, and emitter forms the second port.

10. The fan device with improved speed control module as defined in claim 7, wherein the electrical switch is a diode, whose cathode forms the first port and anode forms the second port.

11. The fan device with improved speed control module as defined in claim 1, wherein the speed adjusting circuit has a first port connecting with the signal output port of the control unit, a second port connecting with the pulse width modulation signal terminal, and an electrical switch linking the first and second ports, with the electrical switch being in an ON or OFF state to control the pulse width modulation signal to enter the control unit or not.

12. The fan device with improved speed control module as defined in claim 11, wherein the electrical switch is a transistor.

13. The fan device with improved speed control module as defined in claim 11, wherein the command output port of the control unit outputs an accelerating command signal as the command signal when the signal input port is grounds or at a LOW voltage level.

14. The fan device with improved speed control module as defined in claim 13, wherein the electrical switch is a npn transistor, whose base connects to the first port, collector forms the second port, and emitter grounds.

15. The fan device with improved speed control module as defined in claim 13, wherein the electrical switch is a pnp transistor, whose base connects to the first port, collector grounds, and emitter forms the second port.

16. The fan device with improved speed control module as defined in claim 1, wherein the signal input port connects to the pulse width modulation signal terminal through a signal input circuit.

17. A plural fan system constructed by a plurality of fan devices, with each fan device comprising:

a stator having a magnetizing member with a plurality of coils, and a driving unit electrically connecting with the coils;

a rotor having a shaft with an end rotatably coupling to the stator, an impeller fixed to another end of the shaft, and an annular magnet mounted to an inner periphery of the impeller and facing the magnetizing member; and a speed control module having a control unit and a speed adjusting circuit, with the control unit providing a signal input port connecting to a pulse width modulation signal terminal, a signal output port connecting to the speed adjusting circuit, and a command output port connecting with the driving unit, with the speed adjusting circuit connecting between the signal output port and the pulse width modulation signal terminal, wherein the pulse width modulation signal terminal is for receiving a pulse width modulation signal, and the control unit sends a command signal to the driving unit and generates a state signal for the speed adjusting circuit to determine whether the pulse width modulation signal enters the control unit or not, with the signal output ports of the control units of the fan devices electrically connecting with each other, wherein the signal output port connects to the speed adjusting circuit through a signal output circuit receiving the state signal, transferring the state signal into a speed adjusting command, and sending the speed adjusting command to the speed adjusting circuit, wherein the speed adjusting circuit has a first port connecting with the signal output circuit, a second port connecting with the pulse width modulation signal terminal, and an electrical switch linking the first and second ports, with the electrical switch being in an ON or OFF state to control the pulse width modulation signal to enter the control unit or not, wherein the command output port of the control unit outputs an accelerating command signal as the command signal when the signal output port is grounds or at a LOW voltage level, wherein the electrical switch is a diode, whose cathode forms the first port and anode forms the second port wherein, in which, upon entry into an abnormal state of any of the fan devices, the speed control module of each normally functioning fan device outputs an accelerating command signal to its driving unit, thereby setting the rotational speed of the remaining functional fan devices to a predetermined speed.

\* \* \* \* \*